UNITED STATES PATENT OFFICE.

HALMEAGH VAN GEASEN, OF NEW YORK, N. Y.

IMPROVEMENT IN MEDICAL COMPOUNDS OR LINIMENTS.

Specification forming part of Letters Patent No. 155,556, dated September 29, 1874; application filed March 21, 1874.

*To all whom it may concern:*

Be it known that I, HALMEAGH VAN GEASEN, of the city, county, and State of New York, have invented a certain Compound to be used as an external wash and an internal medicine, of which the following is a specification:

The object of my invention is the cure of inflammatory complaints, such as toothache, neuralgia, rheumatism, inflammation of the eyes, nerves, &c.; and my invention consists in a composition of oil of hemlock, oil of wintergreen, and oil of sassafras.

To prepare the compound, I take of the three ingredients in about the following proportions, viz: Two parts of oil of hemlock, one part of oil of winter-green, and one part of the oil of sassafras, well mixed, and it produces a colorless liquid.

In using, I apply it externally by any of the known means, and internally (as needed) in drops.

I claim as my invention—

A compound consisting of oil of hemlock, oil of winter-green, and oil of sassafras, substantially as and for the purpose described and set forth.

HALMEAGH VAN GEASEN.

Witnesses:
 JOHN INGLIS, Jr.,
 R. H. REILLE.